ARRANGEMENT IN MAGNETIC RECORDERS
Filed Aug. 31, 1960
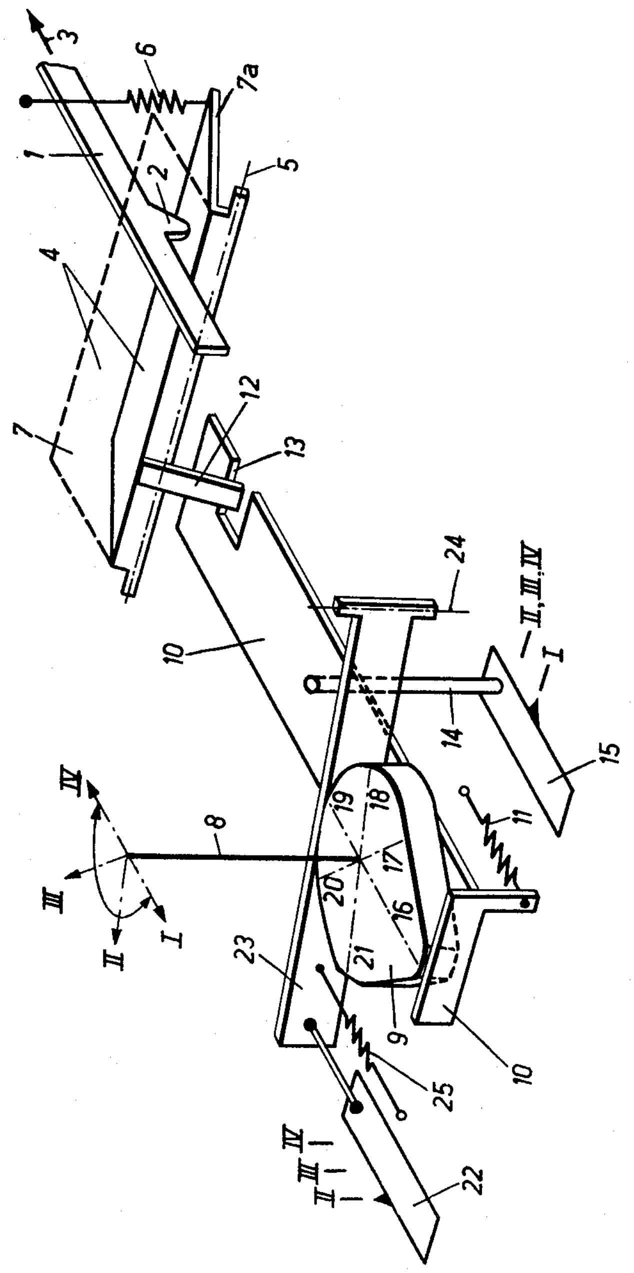
INVENTOR
VIKTOR POLLASCHEK
BY
AGENT 3,179,753

ARRANGEMENT IN MAGNETIC RECORDERS

Viktor Pollaschek, Vienna, Austria, assignor to North American Philips Company, Inc., New York, N.Y., a corporation of Delaware Filed Aug. 31, 1960, Ser. No. 53,238
Claims priority, application Austria, Sept. 4, 1959, A 6,419/59
4 Claims. (Cl. 179—100.2)

This invention relates to a switching arrangement particularly useful in magnetic recorders in which the operation and movements are controlled by means of push buttons which can be arrested in their on positions by means of a locking member common to the buttons, and the amplifier of the recorder can be interchangeably used as a microphone amplifier and/or a phonograph record player amplifier by means of a commutation switch.

The recording-reproduction amplifier of a magnetic recorder is fundamentally a low-frequency amplifier. Consequently, it was only natural to design such an amplifier so that it can also serve for microphone and/or phonograph record amplification functions. For this purpose commutations must be effected at the input and the output and in most cases also at the filters required for magnetic recorder operation. A separate switch is usually provided for switching the sets of contacts required for the commutation. If a magnetic recorder is of the multi-track type, in which a plurality of tracks are recorded on a tape-shaped sound carrier, the same switch is often also used for effecting the changes required for the use of the various tracks. For instance, in four tracks, two track sound carriers being recorded in one direction and two tracks in the opposite direction, a tape recorder can be used stereophonically or monaurally with each pair of tracks. Consequently, the switch which controls the operations of the magnetic recorder for microphone and/or phonograph record operation and stereo and monaural operation must have not one, but three switch positions and hence in total four switch positions.

When using the magnetic recorder amplifier as a microphone and/or phonograph record amplifier, it is naturally desirable to take steps to prevent interference resulting from the magnetic recorder operating members, for example the push buttons, present for magnetic or tape recorder operation being depressed accidentally or erroneously. On the other hand, a safety device must also exist to prevent operation of the commutation switch to microphone and/or phonograph record operation during operation of the amplifier as the tape recorder amplifier. Consequently, several locking devices have previously been suggested corresponding to the design of the switch and of the operation members. However, they have the disadvantage that a separate locking member must be provided and also operated.

According to the invention, a magnetic or tape recorder is provided, the operation of which is controlled by push buttons which can be arrested in their operative or "on" positions by means of a locking member common to all the buttons and in which the amplifier is interchangeably used as a microphone and/or phonograph record amplifier by means of a single commutation switch. The commutation switch is provided, for the purpose of transmitting switching movement to the locking member for the push buttons, with a transmission mechanism, for example a cam or the like, which keeps the locking member out of engagement with the push button as long as the amplifier is connected to microphone and/or phonograph record operation and which allows the locking member to be active only during magnetic recorder operation. A particularly simple arrangement is obtained if the transmission mechanism also switches directly the set of contacts required for the commutation of the amplifier. With a switch for commutating to microphone and/or phonograph record operation, the transmission mechanism also controls the sets of contacts provided for noted switch positions.

In order that the invention may be readily carried into effect, it will now be described in detail, by way of example, with reference to the accompanying diagrammatic drawing. Details which do not relate directly to the invention are indicated with a minimum of detail for the sake of clarity. The figure shows only one embodiment of the invention without being limited thereto.

The set of push buttons for tape recorder operation are symbolized only by a button rod 1, which is in the rest position in the example shown. When brought into the position indicated by the arrow 3, the rod 1 can be arrested through its lug 2 by a locking member 4, which can pivot about a shaft 5 and is pulled upwards by a spring 6. Locking member 4 occupies a position 7 as indicated in broken line when in its arresting position. The separate switch for commutating to microphone and/or phonograph operation is designed as a rotary switch with four positions I, II, III and IV, which can rotate about a shaft 8. The amplifier is switched to microphone and/or phonograph record operation in the switch position I and to tape recorder operation in the switch positions II, III and IV. Since, in the example, the tape recorder is imagined to operate with four tracks, the switch position II represents the stereophonic operation, the switch position III the monaural operation with one group of tracks, and the switch position IV the monaural operation with the other group of tracks. The commutation switch is shown in the switch position I. The transmission of the switching movement of the commutation switch to the locking member 4 for the push buttons, is provided by a cam 9 and a coupling member 10 which are continuously maintained in contact by a spring 11. The transmission mechanism 9, 10 transmits the switching movement of the commutation switch and its shaft 8 through a cut 13 provided in the coupling member 10 to a tongue 12 provided on the locking member 4. When the coupling member 10 is pushed forward the locking member is thus brought into the position *7a* in which it is maintained out of contact with the buttons. None of the tape recorder control buttons can now be locked or made operative, or, if a button was locked, it has been released. The radius 17 of the cam 9 is made shorter than the radius 16. Upon rotation of the switch into the position II, the coupling member 10 can thus move backwards by the action of the spring 11 and the locking member 4, by the action of the spring 6, assumes the position 7 in which it is active for the buttons. The coupling member 10 is provided with a driving element 14, which also operates a set of contacts 15 (shown only diagrammatically) as required for commutating from microphone and/or phonograph operation to magnetic recorder operation, and conversely.

In position I, the mechanism 9, 10 must keep the locking member 4 out of engagement. In the positions II, III and IV, in which positions the magnetic recorder is in operation, the locking device must remain active. Consequently, the radii 18 and 19 of cam 9 are equal to the radius 17. That half of the periphery of the cam 9 which is not used for the transmission of the locking member serves to switch a set of contacts 22 (likewise shown only diagrammatically), by means of which during the magnetic recorder operation the required commutations to stereophonic and monaural operation are effected. For this purpose, a lever 23 pivotal about a shaft 24 is provided which is maintained, with the aid of a spring 25, in continuous contact with the cam 9 at the area which lies diametrically opposite the contact area between the coupling member 10 and the cam 9. The radius 20 has the same length as the radius 19. Upon passing from position I to position II, the set of contacts 15 is moved, but the set of contacts 22 is not moved as yet. The length of the radius 21 is chosen between that of the radius 16 and that of the radius 20. Consequently, in the switch position III, the set of contacts 22 are moved a step and in the switch position IV a further step. It is unimportant for the invention how the sets of conatcts 15 and 22 are designed, for example fixedly arranged switching contacts having slidable or rotary contact pieces, sets of springs, etc.

It needs no special mentioning that the invention is not limited to the particular embodiment described. More particularly the coupling member 10 is not unconditionally required. The shaft 8 of the switch for commutating the microphone and/or phonograph record operation may be position, for example, so that the cam acts directly upon the locking member 4 for the buttons and brings it to the position 7*a*, or releases it for the position 7. In addition, the switch need not be of the rotary type. The movement of the switch, for example of a slidable switch, may be transmitted to the locking member for the push buttons in a similar manner as with the rotary switch, for example, by means of a lug provided on the switch, a driving pin or the like either directly or through the intermediary of a coupling element.

What is claimed is:

1. In a tape recorder/reproducer having an amplifier, control mechanisms for selecting the normal operations of said apparatus including a locking mechanism for maintaining said control mechanisms in operative position, and in which provision is made of switch means connected with said amplifier for alternately connecting and disconnecting said amplifier and said recorder/reproducer and simultaneously disconnecting and connecting said ampilfier with another apparatus such as a microphone or record player; the combination with said recorder/reproducer comprising a moveable transmission mechanism operatively connected with both said locking mechanism and said switch means, movement of said transmission mechanism moving said switch means and said locking mechanism, said transmission mechanism being connected with said switch means and said locking mechanism for moving said locking mechanism to an inoperative position when said switch means is moved to disconnect said amplifier from said recorder/reproducer and connect said amplifier to said other apparatus and conversely releasing said locking mechanism from said inoperative position when said amplifier is connected wth said recorder/reproducer.

2. In a tape recorder having an amplifier and provided with control mechanisms for normal operation of the tape recorder and means connecting the amplifier of said tape recorder to be used for microphone or phonograph recorder amplification; the combination with said tape recorder of a means comprising a moveable transmission mechanism, a locking member operatively connected with both said tape recorder control mechanisms and said transmission mechanism for rendering said tape recorder control mechanisms inoperative in one position of said transmission mechanism, a first electric contact means connected with said transmission mechanism for disconnecting said amplifier from operative relation with said tape recorder in said one position, and second electric contact means connected with said transmission mechanism for connecting said amplifier with said tape recorder and rendering said control mechanisms operative in a second position of said transmission mechanism, and means for moving said transmission mechanism between said one position and said second position.

3. The combination according to claim 2 wherein said transmission mechanism comprises a rotatable cam having a plurality of unequal radii the largest of which defines said one position and a coupling member driven by said large radius and connected with said locking member to position said locking member in a dominant position relative to said tape recorder control mechanism.

4. The combination according to claim 3 wherein said first contact means is operated by said coupling member and said second contact means is operated by a second coupling means operatively connected with the radii of said cam other than said largest radii.

References Cited by the Examiner

UNITED STATES PATENTS

| | | | |
|---|---|---|---|
| 2,768,242 | 10/56 | Weber | 179—100.2 X |
| 2,878,332 | 3/59 | Lacher | 200—50.3 |
| 2,904,649 | 9/59 | Ranson | 200—50.3 |
| 2,909,617 | 10/59 | Shields | 179—100.2 |
| 2,971,762 | 2/61 | Yarn | 274—4 |

IRVING L. SRAGOW, *Primary Examiner.*

STEPHEN W. CAPELLI, BERNARD KONICK, *Examiners.*